US012657417B2

(12) United States Patent
Schüler et al.

(10) Patent No.: US 12,657,417 B2
(45) Date of Patent: Jun. 16, 2026

(54) READING AN OPTICAL CODE

(71) Applicant: SICK AG, Waldkirch (DE)

(72) Inventors: Pascal Schüler, Waldkirch (DE);
Steffen Zopf, Waldkirch (DE)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 18/977,351

(22) Filed: Dec. 11, 2024

(65) Prior Publication Data

US 2025/0190730 A1     Jun. 12, 2025

(51) Int. Cl.
*G06K 7/14* (2006.01)

(52) U.S. Cl.
CPC ......... *G06K 7/1447* (2013.01); *G06K 7/1413* (2013.01); *G06K 7/1443* (2013.01)

(58) Field of Classification Search
CPC .. G06K 7/1443; G06K 7/1447; G06K 7/1486; G06K 7/1413
USPC ........................................ 235/462.08, 462.41
See application file for complete search history.

(56) References Cited

U.S. PATENT DOCUMENTS

| | | | | | |
|---|---|---|---|---|---|
| 8,326,037 | B1 * | 12/2012 | Abitz | ................... | G06K 7/1443 |
| | | | | | 382/101 |
| 11,295,163 | B1 * | 4/2022 | Schoner | ............... | G06V 10/751 |
| 11,314,959 | B1 * | 4/2022 | Alessandrini | ........ | G06K 7/1465 |
| 2011/0127335 | A1 * | 6/2011 | He | ....................... | G06K 7/1456 |
| | | | | | 235/462.41 |

| | | | | | |
|---|---|---|---|---|---|
| 2011/0309138 | A1 * | 12/2011 | Wu | ....................... | G06K 7/1452 |
| | | | | | 235/462.12 |
| 2012/0048937 | A1 * | 3/2012 | Dahari | ..................... | G06K 7/10 |
| | | | | | 235/462.25 |
| 2012/0173347 | A1 * | 7/2012 | De Almeida Neves | .................... | |
| | | | | | G06K 7/10861 |
| | | | | | 705/16 |
| 2020/0034591 | A1 * | 1/2020 | Bachelder | .......... | G06K 7/10811 |
| 2021/0312151 | A1 * | 10/2021 | Scherly | .................... | G06T 7/73 |
| 2022/0100980 | A1 * | 3/2022 | Simpson | ................... | G06T 7/11 |
| 2022/0164557 | A1 * | 5/2022 | Rossetto | ............... | G06V 10/17 |
| 2022/0180084 | A1 * | 6/2022 | Simpson | .................. | G06T 7/73 |
| 2023/0102634 | A1 * | 3/2023 | Gururaja | ............. | G06K 7/1447 |
| | | | | | 382/173 |

FOREIGN PATENT DOCUMENTS

| | | |
|---|---|---|
| EP | 3428835 B1 | 5/2019 |
| EP | 4167123 A1 | 4/2023 |

(Continued)

*Primary Examiner* — Paultep Savusdiphol
(74) *Attorney, Agent, or Firm* — Nath, Goldberg & Meyer; Jerald L. Meyer

(57) ABSTRACT

A method of reading an optical code encodes a message that has a character chain having a plurality of characters. The method includes recording image data having the optical code; segmenting the image data to locate a region of interest having the optical code; evaluating the image data within the region of interest to read the message; and comparing the read characters of the message with at least one scheme that contains an expectation for at least one position of the message of a character at this position of the optical code to be read and thereby determining a scheme that matches the message and agrees with the read message in a minimum portion of the characters In this respect, a size of a region of interest in which an optical code fits is determined from the scheme and a new region of interest of this size is produced.

16 Claims, 3 Drawing Sheets

(56) References Cited

FOREIGN PATENT DOCUMENTS

Figures 1, 2:
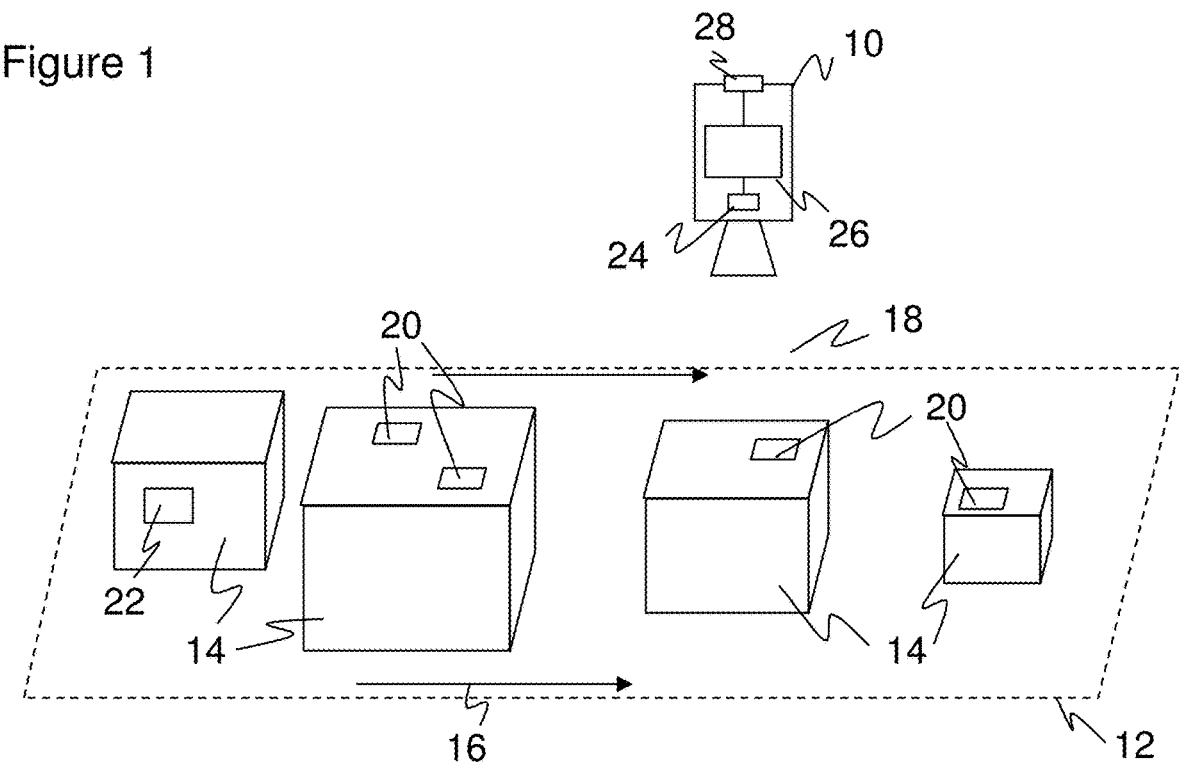

| | | | |
|---|---|---|---|
| EP | 4231195 | A1 | 8/2023 |
| EP | 4258160 | A1 | 10/2023 |

* cited by examiner

Scheme#1:  G000[0-9][A-Z].{5}
Scheme#2:  [A-Za-z].{3}AB[0-9]CD[a-z]1234
Scheme#3:  SampleScheme.{6}
...
...

READING AN OPTICAL CODE

The invention relates to a method of reading an optical code and to an optical reader.

Code readers are known from supermarket checkouts, for automatic parcel identification, for sorting mail shipments, from baggage handling at airports, and from other logistics applications. In a code scanner, a reading beam is guided transversely over the code by means of a rotating mirror or by means of a polygon mirror wheel. A camera-based code reader takes images of the objects having the codes located thereon by means of an image sensor and image evaluation software extracts the code information from these images.

In an important application group, the objects bearing the code are conveyed past the code reader. A scanning code reader here detects the respective codes successively led into its reading zone. Alternatively, in a camera-based code reader, a line scan camera reads the object images having the code information successively and linewise with the relative movement. As a rule, image data are recorded using a two-dimensional image sensor that overlap more or less depending on the recording frequency and on the conveying speed. So that the objects can be arranged in any desired orientation on the conveyor, a plurality of code readers are often provided at a reading tunnel to record objects from a plurality of sides or from all sides. A scanning code reader also detects the remission and thus ultimately image lines that can be assembled to form an object image, even though an image sensor is preferred for this purpose in practice. Code zones can be identified in such an object field and one-dimensional or two-dimensional codes can be read.

Regions of interest (ROIs) or code image zones, that is those zones in the image that may potentially contain a code, are sought in a recorded output image of a code bearing object during a segmentation or pre-segmentation as preparation for the reading of codes. In most of today's code reading applications, the segmentation takes place by traditional image processing algorithms and by manually prepared classifiers. A different approach for the segmentation is based on artificial neural networks, in particular deep neural networks, convolutional neural networks (CNNs).

One of the most important quality criteria for a code reader or for a reading tunnel is a high reading rate. Reading errors make complex error remedies necessary such as the repeat manual scanning or a resorting. The cause for such errors can lie in the quality of the code itself, in an unfavorable reading situation, for example with a code under a film that causes reflections, and finally also in evaluation errors, for instance as part of a binarization of gray values or in the form of imprecisely calculated scanning positions.

A prerequisite for a high reading rate is a correct segmentation. Particularly in the case of codes having planar defects due to reflections or other causes, too small a code image zone is frequently determined or a plurality of code image zones are formed on the same code because the features surfaces diverge due to a defect. The code image zone with respect to the code can also be skewed because interference triggered by the defect changes a preferred main direction. Such segmentation errors result in abbreviated detections and incomplete partial readings.

It is known to improve the segmentation in that it is repeated with different parameters or is carried out multiple times with different parameters. Segmentations are also occasionally carried out in different resolution planes of an image pyramid. This respectively requires a substantial increased effort. However, as rule, real time demands are made in code reading applications that do not permit calculating an image multiple times or even only segmenting multiple times at all. It is moreover questionable whether changed parameterizations or resolutions cope with the addressed segmentation errors at all with planar defects.

A method of reading an optical code is advanced in EP 3 428 835 B1 in which a code word is replaced with a code word known for a position at at least one position of the code in a pre-correction. The known code words are parameterized, are specified by a database of a higher ranking system, or are taught from a history of read codes.

EP 4 258 160 A1 expands this idea and introduces so-called schemes. Expectations of frequently occurring code constellations are formalized in a scheme, for example as regular expressions. Analogously to EP 3 428 835 B, there is a fixed portion here that corresponds to a fixed sequence of characters recurring in a large number of codes and variable portions that detects more general rules such as that only numerals or only letters occur at specific positions. Schemes can be used to recognize a message read from an optical code as read incorrectly or to correct it. Both documents mention a segmentation, but do not discuss segmentation errors or even approaches to remedy them.

It is therefore the object of the invention to further improve the reading of optical codes.

This object is satisfied by a method of reading an optical code and by an optical code reader. It must be stated as a precaution that it is an automatically running process that is in particular implemented on a computer. The optical code contains a message, that is that clear text that should be communicated by the optical code and that is encoded therein. The message has a character chain having a plurality of characters. To read the code and thus the message, image data having the optical code are first recorded in one of the known manners described in the introduction. A region of interest (ROI) having the optical code is then preferably located in the image data by a pre-processing that segments the image data, for example with reference to the contrast. There can then be a plurality of optical codes and a plurality of regions of interest in the image data in which a sought one-to-one association is initially not ensured in any direction; as a substitute, the processing of a region of interest having an optical code is described that can be transferred to other regions of interest. The image data of the region of interest are evaluated in a decoder that attempts to read the message from the optical code using at least one method known per se and therefore not explained in any more detail here. It is conceivable and the invention is even directed to such cases that only a partial reading is possible, that is only a smaller or larger fragment of the message is read.

The read characters of the message are compared with a scheme, preferably repeatedly with a plurality of schemes. For a plurality of positions of the message, a scheme has an expectation on the character located there. As will be differentiated below, they may be very specific expectations on a very specific so-called fixed character or more general expectations on a value range of a so-called variable character such as an upper case letter or a numeral. Whether the scheme matches the message is determined by a comparison of the read characters of the message at these positions with the characters of the scheme.

For this purpose, there must be agreement for a minimum portion of the characters expected by the scheme with the read characters of the message, for example for at least two, at least three, at least four, or even more characters or for a minimum portion of the characters expected from the scheme such as at least a third or at least half. If these conditions are met, a matching scheme has been found. Up to this point, the method is based on EP 3 428 835 B1 and EP 4 258 160 A1 to which reference is additionally made for further details and possible embodiments.

The invention starts from the basic idea of using prior knowledge from the matching scheme to improve the region of interest. For this purpose, the required size of a region of interest into which an optical code corresponding to the scheme would fit is estimated from the scheme. A new region of interest of this size is then produced. In this respect, there are various possibilities in how the new region of interest is represented, for instance by boundary lines, corners, or in that a copy of the image date of only the region of interest is produced. These different representations already apply in another respect to the original region of interest of the segmentation. An attempt is subsequently preferably made with at least one decoder to read the message of the optical code in the new region of interest.

The invention has the advantage that an intelligent post-connection of the segmentation results becomes possible. It is not necessary for this purpose to repeat the segmentation overall, for example, with improved parameters; only a new region of interest of for a specific optical code is produced in a very directed manner that now very likely fully comprises the optical code thanks to the prior knowledge from the matching scheme. A lot of additional processing time is therefore not lost that can instead be invested in more complex decodings or preparations, for instance a filtering, resolution increase, or the like within the new region of interest. The reading rate can thus be further increased, particularly for codes having defects.

The new region of interest is preferably only produced when the optical code had not previously been able to be fully read. There is otherwise no need for a new region of interest and it is consequently also superfluous to calculate the size of a new region of interest. Fully in this connection initially only means in full length; whether the message has also been correctly read can be validated in various ways. A new region of interest would, however, not help in this connection unless it is found as part of the validations that the scheme does not match after all and the code could therefore actually not be fully read.

The new region of interest is preferably only produced when the optical code in accordance with the matching scheme does not already fit in the region of interest located by means of the segmentation. A new region of interest would also no longer be able to improve anything in this situation that the original region of interest was already large enough. If reading errors occurred, they are anyway not due to the segmentation. Whether the optical code fits in the region of interest is not assessed solely by the size; the region of interest can also be displaced and/or skewed with respect to the optical code. It is again meaningful in such cases to determine a new region of interest.

The size of the new region of interest is preferably determined from a module size determined from the read characters of the message and from a number of characters of the message expected in accordance with the matching scheme. The module size designates the size of an individual code module, preferably in the unit of pixels per module. Since at least one fragment of the message was able to be read, the module size is either already present in the decoder or can at least now be determined very easily. The number of expected characters is known from the scheme. The size or a lower limit of the size is then determined, for example, simply as the product of the module size and the number.

A position of the new region of interest in which it is expected that the optical code is completely within the new region of interest is preferably determined with reference to the read characters of the measure and the matching scheme. As already addressed, a region of interest can also be displaced with respect to the optical code. Which defective regions are present in the different directions can be very easily determined from the read characters of the message and the matching scheme. For example, a displacement of the left and/or right border or borders of the region of interest can take place for missing characters at the start and/or end of the message analogously to the calculation of the previous paragraph.

An orientation of the new region of interest in which it is expected that the optical code is completely within the new region of interest is preferably determined with reference to the read characters of the message. The preferred direction of an optical code assumed in the decoder can differ from the actual orientation, particularly when only a fragment is present in the region of interest. The new region of interest can then also be adapted accordingly in its orientation so that expansion regions added to the new region of interest in particular also actually cover the missing code sections.

The position and/or orientation of the new region of interest is preferably related to a start or stop character of the read characters of the message. These are particularly prominent references; the start and stop characters are particularly characteristic, both to recognize and also particularly suitable for the fixing of the position and/or orientation due to the end position. Alternatively, other characters that can still be decoded can be used.

A scheme contains a fixed character, preferably for at least one position of the message, that is expected at this position in optical codes to be read. The scheme consequently has a fixed portion with positions in which respectively very specific characters are expected such as the upper case letter "F" or the numeral "4".

A scheme is preferably considered as matching the message when it agrees with the message in a minimum portion of the fixed characters, in particular at least half of the fixed characters or all the fixed characters. Unlike the original condition, fixed characters are specifically required here and not just any characters of the scheme. Since the invention above all relates to situations in which only a fragment of the optical code has already been able to be read, a comparatively strong agreement in a large number of fixed characters should advantageously be required; there are otherwise too many only apparent matches of a scheme in which there is a high risk that an incorrectly dimensioned, localized, and/or oriented new region of interest is determined.

A scheme preferably contains a variable character that is expected at this position in codes to be read preferably for at least one position of the message, with a variable character being set to a partial region of the possible characters, but not to a fixed character. The scheme thus has a variable portion. No specific character is expected at positions of a variable character, but rather a character that only varies in a partial range of the total of possible characters. Typical examples for a variable character are numerals or letters. It is conceivable only to check whether a scheme matches using variable characters. If therefore a scheme expects a letter, for example, at a position, but finds a numeral in the message, it does not match. The variable portion is preferably only used as a supplement to the fixed portion since otherwise an incorrect scheme is too easily considered as matching due to the inherent ambiguities. Variable characters are, however, helpful as an additional condition.

A scheme preferably has at least one of the following partial ranges of possible characters of a variable character:

non-printable characters, special characters, numerals, letters, lower case letters, upper case letters. These are particularly suitable examples for divisions or classes of the characters conceivable in a message. The division could take place completely at random in principle. Such semantic classes, however, facilitate the understanding for the user so that the use can be diagnosed and optimized more easily. In addition, regularities in codes are likewise rather to be found in the form of semantic classes as any desired divisions in practice. The possible characters of a code are frequently represented by numbers 0 . . . 127 of the ASCII code. Said partial portions can be found in the ASCII code again.

A scheme preferably contains a fixed character or a variable character for every position. Such a scheme can be called complete since there are no positions without an expectation, but which fixed character is there or which partial range of possible characters is possible as a variable character there is rather known from the scheme for every position of the message. A scheme can alternatively be incomplete; there is then at least one completely free character within the limits of the general code specification or how many characters there can still be is not even known. This can in particular be a temporary state during a teaching of a scheme.

A scheme preferably has a code length, i.e. the total number of characters of a message matching the scheme. It is preferably a parameter of the scheme that makes the code length directly accessible. A complete scheme implicitly contains this information, but can additionally also have its own parameter for the code length. The code length can also be known for an incomplete scheme in which there is therefore no expectation for at least one position of which character is located there. The code length can enter into the determination of the required size of the new region of interest. If no code length is present, either implicitly or explicitly, a new region of interest can nevertheless still be determined in which an optical code corresponding to the scheme completely has room. This may still be too small because the scheme is after all incomplete, but is possibly better than the original region of interest, particularly since the procedure can be iterated and a better scheme may be found as matching in the next iteration.

A scheme is preferably formulated as a regular expression that indicates the permitted characters for the respective positions. A regular expression makes it easy for the user to understand and optionally edit the scheme. The internal processing is simultaneously facilitated and the error susceptibility on the programming of the decoders is reduced. Alternatively, a proprietary definition of schemes is conceivable that, however, preferably at least approximately reaches the clarity and formal regularity of regular expressions.

A plurality of read messages are preferably evaluated to teach a scheme, with the read messages in particular being detected in operation or loaded from a logfile. Directly specifying a scheme, either by parameterization in a user interface, in particular a graphical user interface, or by reading by means of data carriers or a network would admittedly generally be conceivable. This is absolutely of advantage for the diagnosis or improvement of schemes. In this embodiment, however, an automatic teaching is provided that liberates the user from this work. The teaching is based on read messages that can preferably originate from the ongoing operation or from an earlier operation, in particular a logfile. A teaching or an adaptation of schemes during operation is furthermore conceivable. It is of advantage if it is known that the messages from which the scheme is taught are correctly read messages. In addition, only reading results are preferably used that were correctly read from the start and in particular have not experienced any correction from the checksum. However, a scheme could, for example, even be deduced from read messages by statistical processes when characters are missing in some messages and/or some messages contain incorrect characters. A sorting of the read messages preferably takes place in the teaching so that only codes from a code family can enter or a plurality of schemes can be taught for a plurality of code families. The code length, but also parts of the schemes themselves, in particular different fixed portions, can be criteria for the sorting. It can therefore occur in the course of the teaching that two or more schemes are formed from one scheme on the basis of differences in the fixed portion.

A scheme is preferably taught from a distribution of read characters at the respective positions of the read message. Which characters occur at the respective positions of the message is accordingly determined. How often a character was read at the respective position can additionally be counted.

The corresponding fixed character is preferably taught at positions at which the same character is always read and the partial range formed therefrom is taught as a variable character at positions at which different characters are read. A character always read again the same at a position is thus assigned to the fixed portion of the scheme. Additional specifications can be made here, for instance that the fixed portion forms a block of adjacent characters or is at the start or at the end of the message. If the read characters vary at one position, the partial range spanned thereby is considered as a variable character of the scheme. This partial range can optionally still be expanded to cover a particular partial region as a whole. If, for example, the characters 1, 3, 5 were read at one position, the partial range can consist of exactly these characters (1, 3, 6) depending on the embodiment, from the whole spread (1, 2, 3, 4, 5, 6) between the read smallest and largest characters 1, 6 also including the non-read characters 2, 4, 5 or from the complete class of numerals. If practically any desired random characters were read at a position, neither a fixed portion nor a useful variable portion can be taught for the scheme here. A blank remains in the scheme, a variable character practically without restriction, or the teaching is aborted. An attempt can furthermore be made to find a partial set of the read messages in which overshoots are eliminated that have brought about this situation. The outliers can be output so that the user has a possibility to check whether it is justified not to take account of these read messages in the scheme.

A scheme is preferably first initialized with blank regions per position, the respective first character read at a position is stored for this position, and every character that is read at a position after the first character for this position and that was still unknown for this position expands the partial range for this position such that the read character is covered. This is an advantageous implementation of the teaching of schemes. In this respect, sorting is as always preferably performed such that the read messages from which the respective scheme is taught belong to the same code family. A blank scheme is initialized that initially has no prior knowledge for any position. A respective character read at a position is first considered as a fixed character of the scheme. This should then be confirmed, however, via the further read messages. It can also be required that a fixed character was read at least m times or m of n times. If a different character is read at a position, this can be considered as an outlier in accordance with an m of n criterion. The characters previously read at this position, however, preferably span the partial range of a variable character. The partial range can be expanded with every newly read character at a position of a variable character. The partial range should preferably remain restricted to a class such as numerals or letters; otherwise a particularly large partial range or an error message of the teaching is conceivable because no regularity or systematics can be recognized at this position that can be sensibly detected in a scheme.

In a preferred further development, an optoelectronic code reader is provided having at least one light reception element for the generation of image data from received light and having an internal and/or external control and evaluation unit in which a method in accordance with the invention for reading optical codes is implemented.

Figure 3:
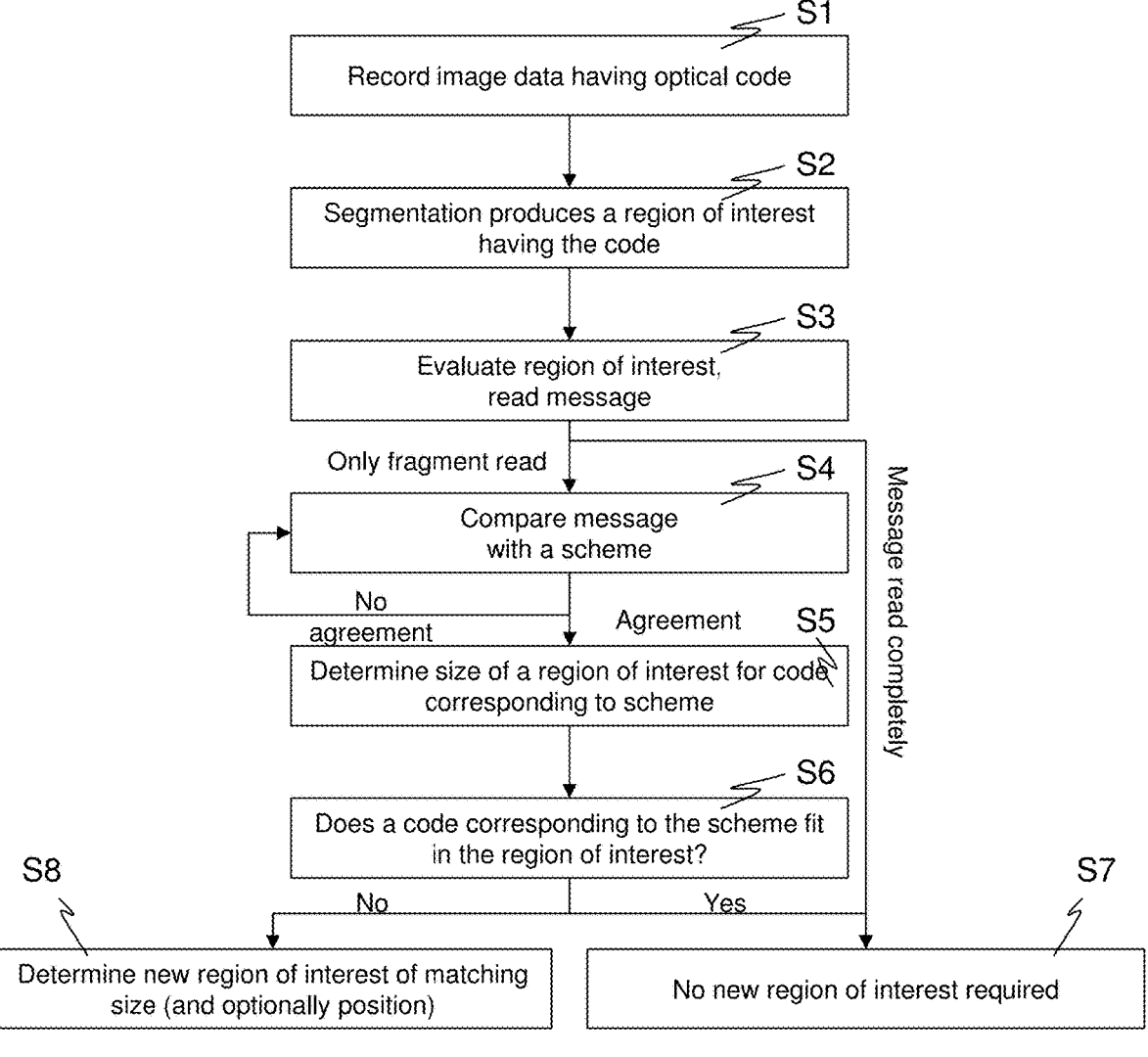
Figure 4:
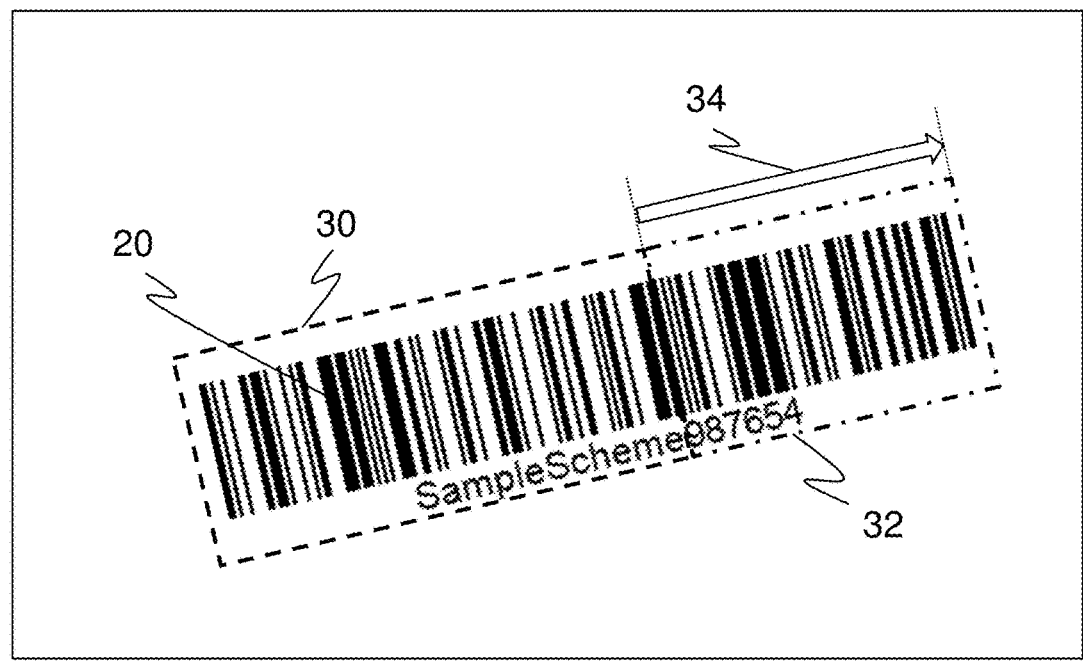
Figure 5:
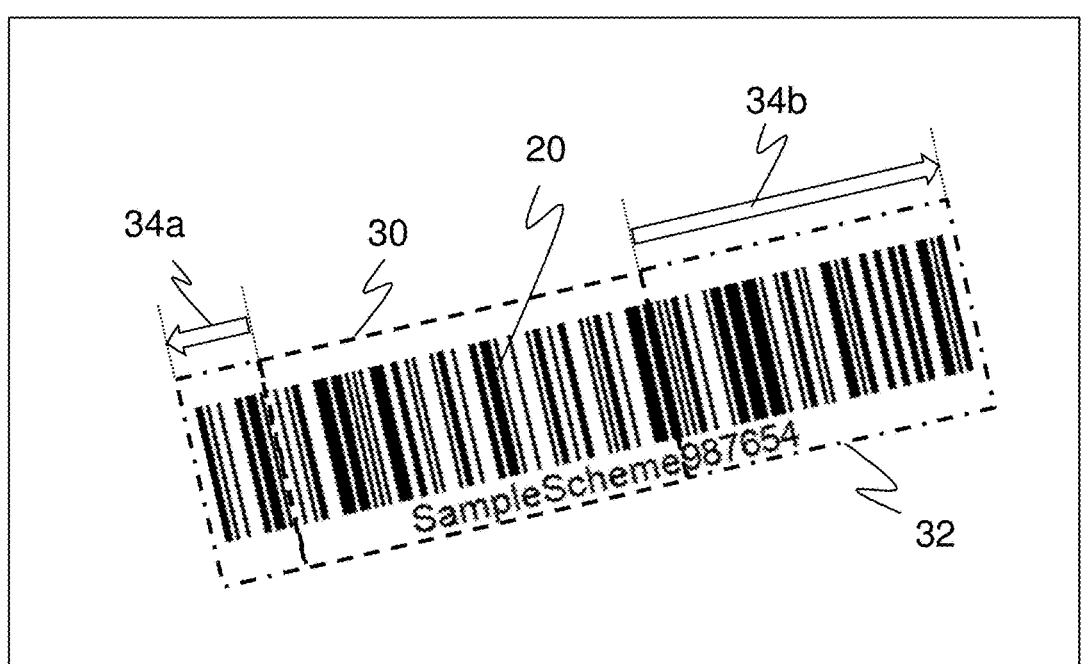

The invention will be explained in more detail in the following also with respect to further features and advantages by way of example with reference to embodiments and to the enclosed drawing. The Figures of the drawing show in:

FIG. 1 a schematic overview representation of a code reader that is installed by way of example above a conveyor belt on which objects having optical codes to be read are conveyed;

FIG. 2 some examples for schemes with expectations of characters of an optical code at specific positions;

FIG. 3 an exemplary flowchart for determining a new region of interest using a scheme that matches the at least partially read message;

FIG. 4 an illustration of a new region of interest expanded to the end of the code; and FIG. 5 an illustration of a new region of interest expanded at both sides of the code.

FIG. 1 shows an optoelectronic code reader 10 which is mounted above a conveyor belt 12 which conveys objects 14 through the detection zone 18 of the code reader 10, as indicated by the arrow 16. The objects 14 bear code zones 20 on their outer surfaces which are detected and evaluated by the code reader 10. These code zones 20 can only be recognized by the code reader 10 when they are affixed to the upper side or at least in a manner visible from above.

Differing from the representation in FIG. 1, a plurality of code readers 10 can be installed from different directions for the reading of a code 22 affixed to the side or to the bottom, for instance in order to enable a so-called omnireading from all directions. The arrangement of the plurality of code readers 10 to form a reading system mostly takes place as a reading tunnel in practice. This stationary use of the code reader 10 at a conveyor belt is very common in practice. The invention, however, relates to the reading of codes or to the code reader 10 itself so that this example may not be understood as restrictive. Codes an also be scanned by hand, for example, or a code or an object 14 having a code can be held in the reading field of the code reader 10 in a presentation application.

The code reader 10 detects image data of the conveyed objects 14 and of the code zones 20 by a light receiver 24 and said image data are further processed by a control and evaluation unit 26 by means of image evaluation and decoding processes. The control and evaluation unit 26 comprises, for example, at least one processing module such as a microprocessor or a CPU (central processing unit), an FPGA (field programmable gate array), a DSP (digital signal processor), an ASIC (application specific integrated circuit), an AI processor, an NPU (neural processing unit), a GPU (graphics processing unit), a VPU (video processing unit), or the like. It is not the specific imaging process that is furthermore important for the invention so that the code reader 10 can be set up in accordance with any principle known per se. For example, only one respective line is detected, either by means of a linear image sensor or by means of a scanning process, and the control and evaluation unit assembles the lines detected in the course of the conveying movement to form the image data. A larger zone can already be detected in a recording using a matrix-like image sensor, with the assembly of recordings here also being possible both in the conveying direction and transversely thereto. The central function of the code reader 10 is the decoding, i.e. the reading, of the message encoded in an optical code as clear text. The message is a character chain of utility characters, preferably with at least one check character that is typically at the end. The code reader 10 outputs information such as messages read from the codes or image data via an interface 28.

An improvement of the segmentation for locating regions of interest (ROIs) corresponding to a code zone 20 will be explained below with reference to FIGS. 2 to 5. It is preferably carried out in the control and evaluation unit 26. It is, however, equally conceivable to output image data or intermediate results via the interface 28 and to outsource at least some of the segmentation, decoding, possible improved determination of regions of interest, and repeat decoding in a higher ranking system such as a control processor, a network, or a cloud. Pre-processing of the image data for segmentation and for localizing code zones 20 and the decoding per se are assumed as known and not described.

FIG. 2 shows some examples for schemes with expectations of characters of an optical code at specific positions. There can be any desired number of such schemes that are in particular specified or are taught by one of the initially already explained methods; three schemes are shown by way of example. One scheme has a fixed portion and/or a variable portion. Exactly one specific character is expected at positions of the fixed portion; a character in a specific range is expected at positions of the variable portion. These expectations are collected in any desired syntax in the scheme; the representation shown is advantageous, but simultaneously purely by way of example. The specifications of the fixed portion and/or variable portion can be noted in any desired manner.

Scheme #1 expects the character sequence "G000" in its first four characters as the fixed portion; then first a numeral and then an upper case letter in a variable portion. Five arbitrary characters then follow. The length of a message matching the scheme thus amounts to at least eleven characters; this code length can additionally be explicitly specified in the scheme. Scheme #2 initially expects two arbitrary letters, then three arbitrary characters, followed by a first fixed portion having the character sequence "AB", a further numeral, a second fixed portion having the character sequence "CD", a lower case letter, and a third fixed portion having the character sequence "1234". Scheme #3 is a particularly artificial example for the following explanations; it expects the fixed portion "SampleScheme", followed by six arbitrary characters.

Other conceivable schemes comprise a fixed portion having more or fewer characters, contiguous or distributed at the start, at the end, or at the middle in the scheme and no or another variable portion and other variations. A scheme can also be used to correct a read message in addition to the functions described here. Reference is again additionally made to EP 4 258 160 A1 with reference to the possible embodiments of a scheme and its application to a code.

FIG. 3 shows an exemplary flowchart for determining a new region of interest using a scheme that matches the at least partially read message; All the steps or only some steps are carried out depending on the embodiment.

Image data having an optical code are recorded in a step 1. A segmentation in which a region of interest having the code is located takes place in a step S2 using a method known per se, for example using the contrasts and/or using a neural network. In this respect, only one region of interest is looked at; in practice, there are typically a plurality of regions of interest that are processed analogously consecutively or in parallel.

The image data of the region of interest are evaluated in a step S3 to read the message contained in the code. If this is fully successful, the method can be aborted; no new region of interest then has to be determined. In some cases, only a partial reading is possible that only detects some of the characters of the message or a code fragment. In particular codes with defects are particularly difficult to decode in full and they are frequently simultaneously already difficult to segment. Regions of interest are then frequently produced that do not completely detect the actual code zone and cause partial readings on the code zone. The remaining method serves an improvement in the case of partial readings in the attempt to still read the code completely by a new region of interest.

The read message or the code fragment is compared with a scheme in a step S4. A plurality of schemes can be considered that are then all used or are used in a partial selection consecutively for the comparison. A check is made in the comparison whether a minimum portion of characters from the scheme can be found in the message. The condition can be set on the fixed portion and/or on the variable portion. The fixed portion is more distinct and is therefore preferably used more or even alone for the basis of the comparison. To avoid post-corrections failing due to too vague an agreement, a strict criterion can be required such as that the total fixed portion agrees or, for example, except for at most one character. If a matching scheme is found, the method is continued with it. If none of the known schemes match, the method is aborted.

Schemes can also be applied to fully read messages, for example to correct or to validate them. Differing from the explanations on step S3, the method can therefore alternatively not yet be discontinued after the complete reading of a message. If it is found with reference to the scheme that only a code fragment could be read, the method can then also be continued with the objective of determining a new region of interest.

The prior knowledge of the matching scheme can be used in a step S5 to determine or estimate the number of characters that the code to be read. would have to have The module size if further known or can at least be determined very simply, that is how large an individual code module is in pixels, by the at least partially successful reading of the message in step S3. The required size of a region of interest in which the code to be read would fit can be very simply calculated from the number of characters and the module size. Care must also be taken that the length of the message in accordance with the scheme in utility characters or clear text does not necessarily directly correspond to the number of code elements of the optical code. There is still an encoding rule therebetween for most code types. It may be the case, for example, that a plurality of code elements encode a utility character and there are possibly no longer visible control characters in the clear text. Both the encoding rule and the control characters are known, however, so that the correct size can be determined and even the direct product of number of utility characters and module size is already a good estimate to which a general addition for said effects can optionally be added.

A check is made in a step S6 whether a code of the size estimated in step S5 fits in the region of interest present. Since it is not necessarily sufficient if the region of interest is large enough, but its position and orientation should also still match the actual code zone, additional factors such as the preferred direction used or the location of specific characters can be considered for more reliability. A start or stop character are particularly suitable anchor points here.

If it is found in step S6 that the code fits in the region of interest, the method is ended in a step S7. It was then not due to the segmentation that only a partial reading was possible, or at least any segmentation error cannot be compensated by post-corrections that can be derived from the matching scheme. The code was, for example, detected in full by the region of interest, but contains defects in which characters remain incorrectly unreadable.

It is found in a step S8 that the original region of interest was too small, was displaced, and/or was skewed. A new region of interest of a matching size is therefore determined that is expanded and optionally rotated in at least one direction corresponding to the required size. The new region of interest is preferably anchored at a start or stop character. The image data in the new region of interest are now again processed by at least one decoder to now nevertheless read the message completely where possible. The explained method can here also be iterated; a different scheme with the result of a different potentially suitable new region of interest possibly matches after the further reading attempts.

FIG. 4 illustrates the method for an example. A barcode is shown that encodes the clear text "SampleScheme987654". However, only the fragment "SampleSche" was able to be read in the region of interest 30 of the original segmentation. It must be noted that the limit in the code elements is relevant and not in the text redundantly printed thereunder. This fragment sufficiently agrees with Scheme #3 of FIG. 2. The expectation can thus be set up that eight characters are still missing and the region of interest 30 is too small for this. A calculation is made as to how large a new region of interest 32 would have to be to comprise the total code corresponding to the scheme and further decodings can be attempted with this new region of interest 32. In this example, the new region of interest 32 is expanded to the code end, as shown by an arrow 34.

FIG. 5 varies the example of FIG. 4. In this case, the region of interest 30 of the original segmentation is a little smaller. The start of the message is also missing; only the fragment "ampleSche" could be read. The example only works when the decoder is at all able to read a code fragment in which both the start and stop characters are missing. Agreement criteria are assumed according to which Scheme #3 still matches. It is, however, not sufficient to attach something at the end in a new region of interest 32. The new region of interest must rather be expanded and displaced, which is the same as expanding it at both sides, as shown by arrows 34*a-b*.

Beyond the examples shown, it may be sensible to rotate the new region of interest 32 if the preferred direction of the code does not match that of the original region of interest 30. Examples of a 1D code are additionally shown. In an analogous expansion for 2D codes, there may be size adaptations in both dimensions at one side or at both sides.

The invention claimed is:

1. A method of reading an optical code that encodes a message that has a character chain having a plurality of characters, comprising:

recording image data having the optical code;

segmenting the image data to locate a region of interest having the optical code;

evaluating the image data within the region of interest to read the message; and comparing read characters of the message with at least one scheme that contains an expectation for at least one character at at least one position of the message of the optical code to be read and thereby determining a matching scheme that matches the message and that agrees with the read message in a minimum portion of the characters, wherein a size of a region of interest in which the optical code fits is determined from the matching scheme, and wherein a new region of interest of the size is produced.

2. The method in accordance with claim 1, wherein the new region of interest is only produced when the optical code had not previously been able to be fully read.

3. The method in accordance with claim 1, wherein the new region of interest is only produced when the optical code in accordance with the matching scheme does not already fit in the region of interest located by means of the segmentation.

4. The method in accordance with claim 1, wherein the size of the new region of interest is determined from a module size determined from the read characters of the message and a number of characters of the message expected in accordance with the matching scheme is determined.

5. The method in accordance with claim 1, wherein a position of the new region of interest in which it is expected that the optical code is completely within the new region of interest is determined using the read characters of the message and the matching scheme.

6. The method in accordance with claim 1, wherein an orientation of the new region of interest in which it is expected that the optical code is completely within the new region of interest is determined with reference to the read characters of the message.

7. The method in accordance with claim 6, wherein the position and/or orientation of the new region of interest is related to a start or stop character of the read characters of the message.

8. The method in accordance with claim 1, wherein, for at least one position of the message, a scheme contains a fixed character that is expected at this position in optical codes to be read.

9. The method in accordance with claim 8, wherein a scheme is considered as matching the message when it agrees with the message in a minimum portion of the fixed characters.

10. The method in accordance with claim 9, wherein the scheme is considered as matching the message when it agrees with at least half of the fixed characters or all the fixed characters.

11. The method in accordance with claim 1, wherein, for at least one position of the message, a scheme contains a variable character that is expected at this position in codes to be read, with a variable character being set to a partial range of the possible characters, but not to a fixed character.

12. The method in accordance with claim 11, wherein a scheme has at least one of the following partial ranges of the possible characters of a variable character: non-printable characters, special characters, numerals, letters, lower case letters, upper case letters, and ASCII codes.

13. The method in accordance with claim 1, wherein a scheme contains a fixed character or a variable character for every position.

14. The method in accordance with claim 1, wherein a code has a code length.

15. The method in accordance with claim 1, wherein a scheme is formulated as a regular expression that indicates the expected characters for the respective positions.

16. An optoelectronic code reader, comprising:

at least one light reception element for generating image data from received light; and a control and evaluation unit configured to perform a method of reading an optical code, the optical code encoding a message that has a character chain having a plurality of characters, said control and evaluation unit being configured for:

recording image data having the optical code from the at least one light reception element;

segmenting the image data to locate a region of interest having the optical code;

evaluating the image data within the region of interest to read the message; and comparing read characters of the message with at least one scheme that contains an expectation for at least one character at at least one position of the message of the optical code to be read and thereby determining a matching scheme that matches the message and that agrees with the read message in a minimum portion of the characters, wherein a size of a region of interest in which the optical code fits is determined from the matching scheme, and wherein a new region of interest of the size is produced.

* * * * *